United States Patent [19]

Antczak

[11] 4,016,130
[45] Apr. 5, 1977

[54] PRODUCTION OF SOLID, RIGID FILLED POLYURETHANE COMPOSITES

[76] Inventor: Thaddeus Antczak, 32431 Halmich Drive, Warren, Mich. 48092

[22] Filed: May 15, 1975

[21] Appl. No.: 576,371

[52] U.S. Cl. .......................................... 260/37 N
[51] Int. Cl.² ........................................ C08K 9/00
[58] Field of Search ................................ 260/37 N

[56] References Cited

UNITED STATES PATENTS

| | | | |
|---|---|---|---|
| 3,391,101 | 7/1968 | Kelly et al. | 260/37 N |
| 3,489,723 | 1/1970 | Kraft | 260/37 N |
| 3,523,103 | 8/1970 | Zemlin | 260/37 N |
| 3,621,000 | 11/1971 | Schmelzer et al. | 260/37 N |
| 3,832,323 | 8/1974 | Ramey et al. | 260/37 N |

*Primary Examiner*—Melvin T. Marquis
*Assistant Examiner*—S. M Person

[57] ABSTRACT

Solid, rigid, filled polyurethane composites are prepared by a process comprising admixing a dried polyisocyanate component containing a degreased dust- and solid-impurity-free filler with a dry polyol, degassing said admixture until no further gas evolution occurs and effecting reaction between the polyisocyanate and polyol.

7 Claims, No Drawings

PRODUCTION OF SOLID, RIGID FILLED POLYURETHANE COMPOSITES

BACKGROUND OF THE INVENTION

Manufacturing of polyurethane flexible- and rigid foams, as well as of solid polyurethane elastomers are well-established industries. Recently, solid regid polyurethanes are becoming to be interesting.

Applications of polyurethane foams and elastomers are well known. As far as solid rigid polyurethanes are concerned they can be used as structural materials to replace metal, woods or other construction materials. Since their physical and mechanical properties can be tailored to suit the given requirements there are many possibilities for various outlets. The tailoring can also be done by applying fillers, which, in some cases, provide useful and appreciable properties. But there are some critical points for applying fillers with polyurethanes. The first one is the water content of fillers as well as of starting components for polyurethanes. To get polyurethanes without bubbles, water must be eliminated completely. The second point is the interfacial contact between resin and filler. This intimate contact is of course the essential problem of adhesion.

In up-to-date polyurethane systems fillers are added to polyols, not to poly-NCO-components.

In the procedure described in this invention the -NCO groups are brought in the immediate neighborhood of the filler by mixing both dry poly-NCO-component and filler in vacuo. In that way air and moisture are eliminated from the void spacing between asperities of both the macro- and microroughnesses of the filler. Only then electrostatical or molecular attraction between -NCO groups and active or activated sites of the filler, as well as chemical reaction between -NCO groups and, replaceable by sodium, active hydrogen of the filler can take place.

The activity and reactivity of an isocyanate are due to the chemical structure of the -NCO group, its configuration of electrons with their resonance possibilities:

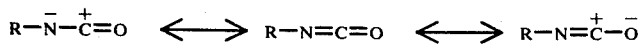

For the reason of the above mentioned attraction or reaction phenomenons an excess of the applied poly-NCO-component is needed. That excess is applied, basically, in accordance with the critical pigment volume concentration.

SUMMARY OF THE INVENTION

This invention relates to a method for preparing polyurethane compositions. More particularly this invention relates to a method for treating poly-NCO-component with fillers in such a manner that air and moisture are eliminated completely and that the interfacial contact of poly-NCO-component with filler is immediate.

A process has been discovered for preparing filled polyurethane composites which comprises: 1) drying the poly-NCO-component, and separately the polyol, in vacuo 0.5 – 1 mm Hg at room temperature or at a temperature slightly elevated, adjusted to the appropriate processing viscosity, 2) cleaning and drying the filler at temperatures over 100° C to a constant weight, 3) adding with stirring the hot dry filler to the dry poly-NCO-component at room temperature and atmospheric pressure and continuing stirring in vacuo, 4) adding the dry polyol to the slurry filler/poly-NCO-component and mixing vigorously at atmospheric pressure for some seconds, 5) degassing the mixture filler/poly-NCO-component/polyol in vacuo until no bubbles are evolved, 6) pouring the degassed mixture into dry molds.

DETAILED DESCRIPTION

A. Pretreatment of the poly-NCO-component. — Commercial Papi having the general formula

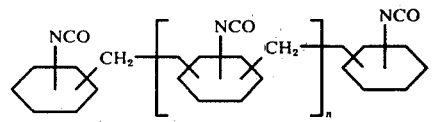

wherein n has an average value of about 1 characterized by %NCO 31.5, MW 400, viscosity 250cps at 75° F was submitted to degassing and dewatering with vigorous stirring in vacuo 0.5 – 1 mm Hg first at room temperature for about 20 minutes and then at the temperature up to about 50° C until no bubbles were evolved. After that it was allowed to cool to room temperature in vacuo with stirring. The whole operation lasted about 1 hour.

B. Pretreatment of the polyol. — Commercial Pluracol 565 characterized by OH index 329, functionally 3.514, eqwt 170.6 and viscosity 2000 cps at 75° F was submitted to degassing and dewatering first at room temperature in vacuo 0.5 – 1 mm Hg, then at temp. about 50° C still in vacuo with vigorous stirring until no formation of bubbles occured. After that it was allowed to cool to room temperature in vacuo with stirring. That all took about 2 hours.

C. Pretreatment of the filler. — The pretreatment was done in 3 steps.

1) Distilled trichloroethylene was added to commercial SiC, grit 600, for degreasing. The slurry was stirred for about 10 min., then submitted to sedimentation and the liquid layer removed by decantation. That operation was repeated until no residue was left from the evaporated "tri," taken from the decanted layer. Then the slurry was filtered and dried.

2. After degreasing demineralized water was added to the degreased and dry SiC-powder and the slurry was mixed vigorously for some minutes. After sedimentation an upper foamed layer, containing solid impurities was formed. It was thrown away. The same, as above, operation was repeated until no upper layer with solid impurities was formed.

3. After extraction of step 1) and floatation of step 2) the pH adjustment was done. To the slurry SiC/water 1% aqueous solution of $Na_2CO_3$ was added to adjust pH to about 7. Finally the slurry was filtered, the residue was dried in an oven for 2 hours at 140° C and, after that, kept at 105° C ready to apply at that temperature.

D. Filling the poly-NCO-component. — To the dry Papi at atmospheric pressure with stirring was added part by part the hot (105° C) dry SiC in the quantity of 50% calculated on weight of Papi. Further stirring was done in vacuo until no formation of bubbles was visible.

EXAMPLE

Preparation of the solid rigid polyurethane composite. — In a 2-liter polyethylene pot to 500 g of dry polyol (Pluracol 565) the slurry composed of 489 g dry Papi containing 244.5 g dry SiC was added at atmospheric pressure. Vigorous stirring was done at room temperature for about 45 sec. After that the pot containing the slurry Papi/polyol/SiC was put immediately into the vacuum container and degassed in vacuo, for about 3 minutes, no bubbles were evolved. Then, at atmospheric pressure, the mass was poured into a dry mold. After about 10 minutes the mass began to thicken. It was demoldable after about 3 hours.

The molded composite was bubble-free. There was no additional evolution of bubbles when the molded composite was heated to 75° C for 3 hours, then to 110° C for 2 hours, and to 140° C for 1 hour. There was no evolution of bubbles, too, when unfilled solid rigid polyurethane was submitted to heating at above temperatures.

The molded composites filled with SiC, alundum (flour), Zirox B were abrasive wear resistant at temperatures up to about 130° C. There was minimal abrasion when samples were abraded with Taber Abrader. But there were visible differences in abraded volumes, when samples were tested with the abrader, which is applied for abrasion test of cemented tungsten carbide, according to the method CCPA-P-112 of Cemented Carbide Producers Association. That abrader was applied to get comparative results of abrasive wear resistance 1) cemented tungsten carbide, 3) steel 1020, 3) industrial wear resistant ceramic and 4) solid rigid polyurethanes filled with SiC, or alundum, or Zirox B. Samples No. 3) and No. 4) were chosen as protective wear resistant coverings for mild steel blades for mixers of hot foundry sand.

Test results showed that solid rigid polyurethanes filled with SiC, or alundum, or Zirox B were more wear resistant than steel 1020 (sample No. 2.), or industrial ceramic (sample No. 3.), but less resistant than cemented tungsten carbide.

I claim:

1. A process for the production of solid, rigid filled polyurethane composites which comprises
    a. preparing and maintaining separately an isocyanate component and a polyol each of which has been dried and is bubble-free,
    b. adding with stirring to said isocyanate component a degreased, dust- and solid-impurity-free filler dried to a constant weight at a temperature over 100° C. and maintained under vacuum,
    c. admixing the filler-isocyanate component obtained from step (b), above, with said polyol,
    d. degassing under vacuum the admixture obtained in step (c), above, until no gas evolution occurs, and
    e. pouring the degassed admixture obtained in step (d), above, into a suitable dry mold at atmospheric pressure to effect reaction between the isocyanate and polyol.

2. The process of claim 1, wherein the filler of step (b) is obtained by first slurrying the filler with a degreasing agent and removing said degreasing agent until the thus removed degreasing agent does not leave any residue after evaporation, followed by mixing of the degreased filler with mineralized water until, after sedimentation of the filler, no floating solid impurities are formed.

3. The process of claim 2, wherein the pH of said filler-mineralized water slurry is adjusted to between 6.5 and 7.5.

4. The process of claim 3, wherein said filler is a member selected from the group consisting of silicon carbide, aluminum oxide and zirconium oxide.

5. The process of claim 4, wherein said filler is silicon carbide.

6. The process of claim 4, wherein said filller is aluminum oxide.

7. The process of claim 4, wherein said filler is zirconium oxide.

* * * * *